United States Patent [19]

Anderson

[11] 4,213,863

[45] Jul. 22, 1980

[54] FLOW-THROUGH COALESCING SEPARATOR

[75] Inventor: Joseph W. Anderson, Bellevue, Wash.

[73] Assignee: Marine Construction & Design Co., Seattle, Wash.

[21] Appl. No.: 1,743

[22] Filed: Jan. 8, 1979

[51] Int. Cl.² ............................................. B01D 29/02
[52] U.S. Cl. ................................. 210/108; 210/350; 210/391; 210/DIG. 5
[58] Field of Search ............... 210/106, 108, 350, 351, 210/391, 393, 397, DIG. 5

[56] References Cited

U.S. PATENT DOCUMENTS

| | | | |
|---|---|---|---|
| 2,087,708 | 7/1937 | Trinkle | 210/350 |
| 3,131,040 | 4/1964 | Dunn et al. | 55/159 |
| 3,276,594 | 10/1966 | Gwilliam | 210/350 |
| 3,278,031 | 10/1966 | Rosaen | 210/350 X |
| 3,334,042 | 8/1967 | Tietsma | 208/187 |
| 3,450,632 | 6/1969 | Olson et al. | 210/23 |
| 3,608,727 | 9/1971 | Grutsch et al. | 210/242 |
| 3,617,551 | 11/1971 | Johnston | 210/350 X |
| 3,913,513 | 10/1975 | Pedone | 210/194 X |
| 4,022,694 | 5/1977 | Fruman | 210/350 |
| 4,039,441 | 8/1977 | Fett | 210/23 R |
| 4,052,316 | 10/1977 | Berger et al. | 210/DIG. 5 |

FOREIGN PATENT DOCUMENTS

| | | |
|---|---|---|
| 632698 | 7/1936 | Fed. Rep. of Germany . |
| 2354939 | 10/1974 | Fed. Rep. of Germany .... 210/DIG. 5 |
| 462499 | 4/1937 | United Kingdom . |

*Primary Examiner*—John Adee
*Attorney, Agent, or Firm*—Christensen, O'Connor, Johnson & Kindness

[57] ABSTRACT

A flow-through coalescing separator applicable to clean immiscible liquids and to dirt-carrying immiscible liquids, such as dirty oil and water mixtures. A normally retracted piston periodically backwashes and thereupon compresses the filter body in a pressure vessel so as to purge the filter body of accumulations of dirt and hydrocarbons. When the piston is thereafter being retracted by restoration of input liquid flow pressure, positive coupling of the piston to the filter body stretches it back to its original length and thereby to the full functioning open-pore condition despite wall friction and limited rebound capability of the filter body material. The system lends itself to manually controlled operation and to automatically controlled operation, either in the continuous flow-through mode or in the more frequently interrupted retention flow-through mode. In either mode the system provides predictably-metered backwash liquid volume determined by pressure vessel capacity from its input chamber to the working face of the piston.

16 Claims, 5 Drawing Figures

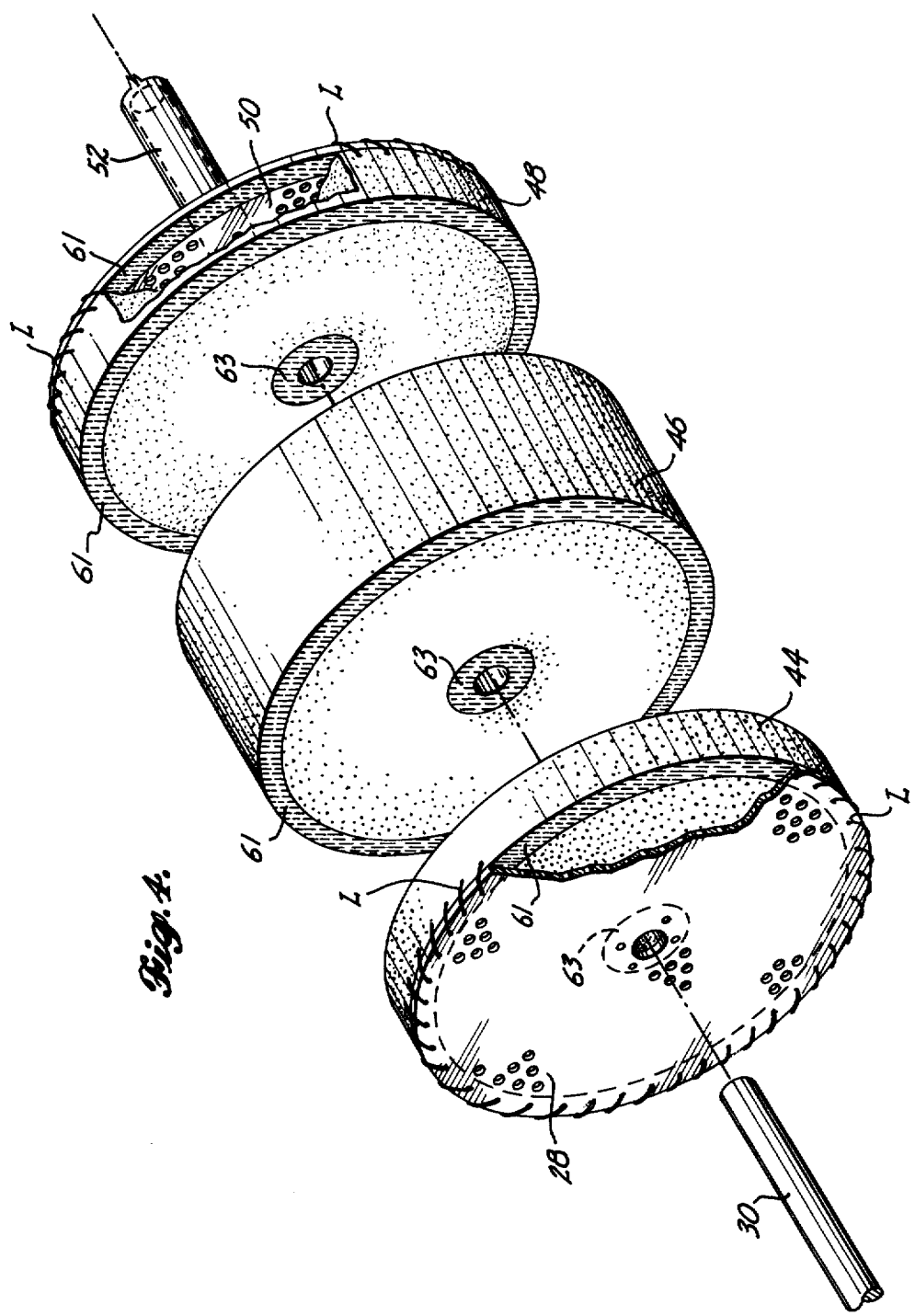

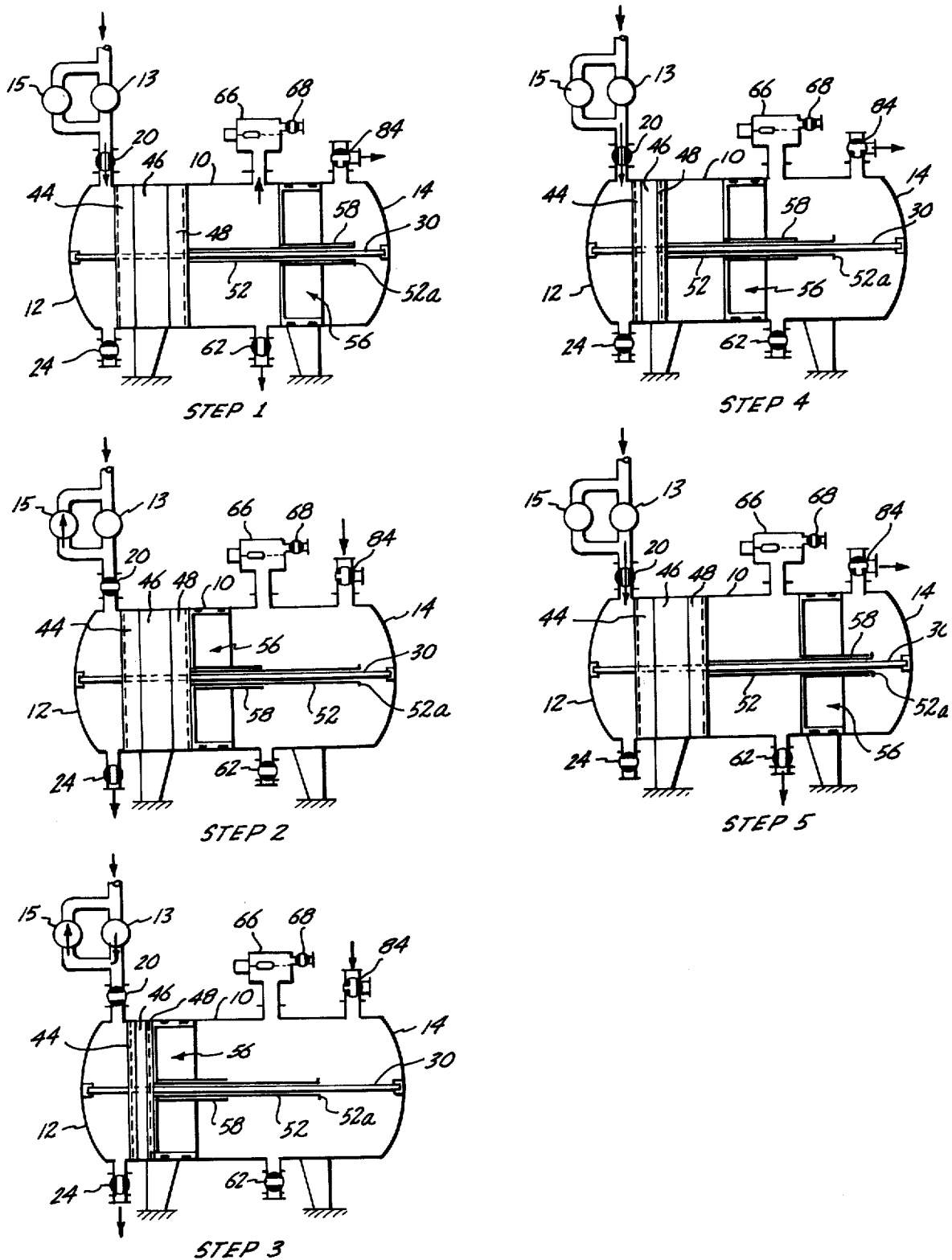

FLOW-THROUGH COALESCING SEPARATOR

BACKGROUND OF THE INVENTION

This invention relates to improvements in flow-through filtration type devices for separating immiscible liquids which may carry particulate solids, such as for separating dirty oil from water. A main object of the invention is to provide such a separator apparatus useful in remote oil fields wherein most of the oil of whatever viscosity or density presented (together with iron sulfide particles or other dirt) must be separated from the large volumes of production water coming up with the oil before the water can be lawfully discharged into the open environment. The invention is herein illustratively described by reference to the presently preferred embodiment thereof; however, it will be recognized that certain modifications and changes therein with respect to details may be made without departing from the essential features involved.

Separation of oil (clean or dirty) from water for purposes of environmental protection and for other applications imposes limitations of a practical and economic nature on the types and requirements of separator apparatus that can be used. In many cases, very large volumes of mixture must be processed on a continuing basis. Electrical power to drive mechanical separators or high-pressure pumps is often not conveniently available nor are other forms of high-pressure fluid sources. In some situations, the difference between being able to operate and not operate at all, such as in remote oil fields, can be made by whether sufficient high-volume processing capability exists that will serve reliably over long periods with little or no human attention.

A chief technical problem in achieving the required high degree of separation, such as 99% removal of oil and solid materials from waste water, is occasioned in large part by the emulsified state of the oil, i.e., by the extremely small size and dispersion of oil particles often present in oil well production water. Indeed this is also often true in many industrial applications wherein similar oil/water separators are necessary. These oil particles quite often range in size down to ten microns or less in diameter, making it virtually essential to coalesce the droplets into larger drops and globules before effective separation can take place. To effect such coalescence and separation in a short time period, in a reasonably compact apparatus enclosure, and by arrangements capable of processing at very high volumetric rates under the limitations mentioned above demanded in many installations, including remote oil field production operations, is a broad object of this invention, including in connection therewith also the effective removal of solid particles and the adaptability of the apparatus to work efficiently with oil of high density and viscosity as well as the grades or types lighter than water.

A number of known types of separators are ruled out immediately as unsuitable for the described task. For example, vertical tube coalescers and parallel plate coalescers are not effective with oil droplet sizes below about fifty microns and they provide very limited recovery of oil-wetted solids. Neutrally byoyant oil-wetted solids as well as heavy oils (i.e., having a specific gravity near that of water) pass through such separators virtually undiminished.

Cartridge filter type coalescers are also unsuitable for many such applications. While they remove oil droplets down to about ten microns in diameter and collect oil-wetted solids, they plug too rapidly because of the extremely small pore sizes used in order to be practical for the kinds of jobs indicated herein. One recent study, for example, indicated an average operating life of a cartridge type coalescer of less than about two hours before it was necessary to replace the cartridge in such a conventional task as ship's bilge oil/water separation.

Furthermore, effective operation of a cartridge type separator depends upon establishing a high-pressure drop across the cartridge, i.e., up to 70 pounds per square inch. This requires a high-pressure source, usually a local pump that consumes energy and that itself tends to aggravate the problem of emulsification because of the action of a high-pressure pump in shearing the oil droplets into yet smaller droplets in feeding the separator.

Deep bed media filter coalescers have also been used with effectiveness in some situations but in general are unsuitable for the type of application to which this invention is primarily directed. Such coalescers utilize a bed of granular media, such as sand, glass beads, polypropylene beads or chips, anthracite granules, etc., the bed being usually about nine inches or more in depth. Oil-wetted solids are captured and recovery of oil droplets down to extremely small sizes can be achieved. However, in a deep bed coalescer relatively high pressure drops across the bed are necessary, i.e., not uncommonly as high as fifty pounds per square inch. This usually requires pumping with attendant expenditure of energy and additional emulsification of the oil by the feed pump itself. Furthermore, reasonably uniform regeneration of the bed by backwashing in order to remove accumulated solids and oils is difficult to accomplish. There is a tendancy for the bed to "mud ball" and consequently for the flow to channelize through some areas of the bed in preference to others so that uniform fluidization and regeneration of the granular bed during backwashing is not achieved, especially when the system has been used to separate highly viscous oils. Furthermore, it is necessary in backwashing the deep bed to use large volumes of backwash liquids, thereby presenting a problem of disposal of the oil contaminated backwash liquids themselves.

In a deep granular bed system, flow rates are limited to about ten gallons per minute per square foot of bed area, which is small by comparison to requirements in many applications where apparatus space limitations are imposed. Moreover, solids volume retention capacity of such beds per unit of volume is small, approximately one to three percent of the bed material volume.

Rotary drum separators have also been used for coalescing and separating oil from water. These separators utilize a compressible filter band or matrix of oleophilic hydrophobic material encircling a backing drum and passing continuously beneath a compression roll that squeezes out the oil accumulations in the matrix. Such separators are effective with small size oil droplets such as down to ten microns or smaller, but because of the nature of the self-cleaning action in the machine effected by the squeezing roll, they tend to pass solids along with the oil. In addition, such separators are practically limited to oils of low viscosity. Heavy oils being separated at reasonably high drum rotation speeds tend to greatly shorten the life of the filter band material itself due to repeated rapid compression and release of the band. Under these conditions, the matrix strands are repeatedly overstressed in tension by the direct physical drag of viscous oil being rapidly squeezed from the strands ahead of the squeeze roller. Such separators differ from compressible media separators of the flow-through type in that the water does not flow unidirectionally but rather flows inwardly through the outer surface regions of the band during injection and then reversely outwardly as the filter band is squeezed against the backing drum.

This invention, in avoiding difficulties and limitations of these other forms of separators, and of prior art coalescing separator devices generally, provides an improved flow-through coalescing separator operable either in a continuous mode with lighter oils, or in a retention mode primarily applicable to mixtures carrying oils of a density near that of water, or to especially dirty mixtures. In the continuous mode, the light oil coalesces in the filter body and is allowed to progressively saturate the same to a limited degree with the water continuing to flow through the body and to leave its downstream face substantially freed of oil and dirt. The filter body medium used is preferably a fully dewindowed or reticulated synthetic foam, such as polypropylene foam, polyurethane foam or similar open-pore visco-elastic material that can be highly compressed to squeeze out accumulated oil and dirt and then reexpanded and that has, or that can be treated to exhibit, an affinity for oil and a repellency to water. In such flow-through separators as in this invention, when operated in the continuous mode, coalesced oil accumulating on the filter body strands eventually builds up to the point of saturation where it sheds off the downstream faces of the strands in the form of coalesced and coalescible large droplets carried downstream by the continued passage of water and that are usually larger than 300 microns in diameter. These emerge into a collection chamber of sufficient volumetric cross-section (i.e., having an outlet preferably near the bottom and small in diameter by comparison) that the low flow rate attending normal flow-through operation of the device allows the oil to rise to the surface according to Stokes' law and be collected in a regulated discharge chamber. Regeneration of the filter body is required only periodically in order to remove solids and heavier oils when they have accumulated to an extent that impedes the flow through the filter medium to an excessive degree for practical rates of production.

In the retention mode, applicable especially to oils near the density of water and to dirty oils, coalescence in the filter media occurs and solid particles accumulate until the medium is substantially saturated with oil and/or solid particles. At that point and before the oil breaks through the filter body to mix with the otherwise purified water passing from the filter body, a condition which may be detected by any of suitable methods, including observation through a window to note oil and/or dirt build-up and/or reduced flow rate, the filter body is regenerated by interrupting the flow-producing pressure and compressing the filter body in order to express the collected oil, solids and water. Since the oil, water and solids are backwashed and squeezed out of the device during such compression, no specific gravity difference is required in order to remove the oil and solids from the mainstream of water which passes through the filter body during the filtration stage. For this reason the device can be used in the retention mode with oils of any specific density.

With a flow-through separator of this general type such as disclosed in the U.S. Pat. Nos. 3,617,551 and 4,022,694, specific flow rates can be much higher than that attainable with granular deep bed separators for example; hence, for a given volumetric process and capacity, the apparatus can be considerably smaller in size. Moreover, solids volume retention is higher, reducing the frequency of regenerating required, and pressure drop across the filter body necessary to obtain effective coalescing filtration can be small (i.e., under five pounds per square inch) thereby reducing or eliminating the aggravation of added emulsification of the oil produced if high-pressure pumping were to be necessary, together with the energy cost of such pumping. This type of apparatus, especially with the improvements afforded by the present invention, can be produced at relatively low cost and will operate durably with virtually negligible maintenance requirements over long periods of time.

Additional patents of some background interest are the following:

| U.S. 3,087,708 | Great Britain 462,499 |
|---|---|
| 3,131,040 | |
| 3,276,594 | Germany 632,698 |
| 3,334,042 | |
| 3,450,632 | |
| 3,608,727 | |
| 3,913,513 | |
| 3,039,441 | |
| 3,083,778 | |
| Re 21,639 | |

In the prior art proposal of the U.S. Pat. No. 3,617,551, practical difficulties are encountered that limit the effectiveness, reliability and efficiency of the apparatus for useful application in the kinds of environments and for the kinds of uses referred to above. One principal difficulty, for example, lay in the unresolved design dilemna resulting from the necessity of preventing bypass flow around the filter body during flow-through operations by maintaining the filter body in firm contact with the enclosure wall, hence under lateral compression afforded by the restricting effect of the wall. This created a high degree of wall friction resisting compression and reexpansion of the filter body longitudinally of the pressure chamber in order to periodically backwash its pores and squeeze out the oil and dirt. As a result of this high degree of wall friction and the inherently low degree of resilient rebound inherent in the visco-elastic nature of the most suitable filter body materials, expansion of the filter body to its original length and to the full degree of pore-openness was not achieved. Thus, with continued use the openness to flow, and the oil and dirt holding capacity of the filter body, became progressively more limited.

Further, any tendency of the check values to stick closed by the adhesiveness of heavy oils or of tarry components in the U.S. Pat. No. 3,617,551, especially when attempting to operate the system under available low input liquid flow-through producing pressures, such as five pounds or less per square inch, created additional limitations and maintenance requirements. On the other hand, in the U.S. Pat. No. 4,022,694, bidirectional compression and outflow (i.e., out both faces of the filter body) during compression caused the retained contaminants to flow downstream as well as upstream, while solids and heavy residues would increasingly build up with time in the central region of the filter body rather than to be expurgated on each compression cycle.

A further object of the present invention is to overcome such difficulties and limitations in prior flow-through coalescing separator proposals and, more specifically, to provide an improved compressible filter medium flow-through coalescing separator of low-cost construction, using lightweight parts and capable of long-term, trouble-free automatic operation (or manually controlled operation, if preferred), with long operating life of its regeneratable filter body and of its few and simple movable parts.

A further object is to provide such a flow-through oil coalescing separator with low flow-through resistances and relatively high holding capacity of its filter body, both originally and after each regeneration (compression/reexpansion) cycle.

A related object is to provide such a coalescing separator that is capable of accumulating and holding a maximum amount of dirt and oil accumulation, before increased flow-through resistance makes regeneration necessary, and which may be purged of such accumulation quickly by squeezing the filter body preceded by backwashing the same using consistently the same measured amount of backwash water adequate to the job, but not an excessive amount that of itself must be then further processed or separated from the expurgated dirt and oil carried with it.

BRIEF DESCRIPTION OF THE INVENTION

As herein disclosed the novel apparatus includes a substantially cylindrical pressure vessel having an input chamber at one end adjoined first by a compressible filter body of open-pore synthetic foam such as polyurethane or polypropylene foam, and next by a processed liquid collection chamber. The filter body fills the vessel cross-section and is bonded at its ends to respective multiply-apertured plates, that next to the input chamber being fixed and that at the opposite end being movably mounted on a central guide member so as to move slidably lengthwise of the chamber. A normally retracted piston slidably mounted in the pressure vessel is pressure-actuated by fluid introduced into the end of the pressure vessel opposite the input chamber as to be advanced through the collecting chamber to produce initial backwash flow, and thereafter through the region occupied by the filter body to physically compress the filter body. After a predetermined compression holding period that allows vestigal drainage of oil from the filter body strands, actuation pressure behind the piston is removed. Renewed flow of unprocessed liquid into the inlet chamber then forces the piston back toward its fully retracted position. In the piston's retraction stroke, interengageable elements respectively movable with the piston and with the adjacent end plate forcibly retract the latter so as to positively stretch out the filter body to its original length despite wall friction, and thereby reestablish the open-pore condition thereof.

Any of suitable techniques including sensing of pressure drop across the filter body during flow-through operations may be used to automatically initiate the piston movement cycles. Piston position and/or pure time lapse response after cycle initiation may be used as a means to initiate the reversal of piston motion after its compression and hold stroke.

In the operation of such a system, very small pressures at the input (such as five pounds per square inch or less) become fully adequate to force the coalescing filtration operation and to produce the periodic piston retraction movement effective to reexpand the filter body fully after each compression cycle. Moreover, the natural sticking tendency of the filter body material on the vessel walls coupled with the limited elastic rebound of the compressed filter body no longer presents a regeneration problem, nor does it impose a compromise requirement on the design.

By bonding together layers or sections of foam material, one of largest pore size next to the inlet followed by others of progressively smaller pore sizes, solids are trapped in the larger pore material so that they do not reach and plug up the smaller pore layers or sections beyond. Such solids are also then readily removed by backflow preceding and accompanying the filter body compression cycle.

Substantially without regard to the size or scale on which the device is built, fluid (gas or liquid) pressures as low as twenty pounds per square inch available to advance the piston are ample to backwash and compress the filter body. Such pressures are normally readily available from water or gas supplies, or in any event from a low-pressure pump installed for the purpose. The low pressures exerted on the upstream face of the piston during the retraction phase impose no appreciable bending stresses on the piston or other parts of the apparatus. Point loads are not applied, since the force pressures are distributed and uniformly balanced by opposing pressures. Thus, the pressure vessel itself may be made of thin-wall material as large as desired, such as ten feet or larger in diameter and the filter body end plates and piston plate and skirt also of relatively thin metal. Some distribution of structural backing for the upstream filter end plate is adequate to keep it substantially flat under the forces of compression applied to the filter body with the piston advanced.

These and other aspects, features and advantages of the invention will more fully appear from the description of its preferred embodiment that follows.

BRIEF DESCRIPTION OF DRAWINGS

FIG. 4 is an isometric view of the filter body and multi-apertured end plates with sections of the filter body separated in the view to show the interface areas over which the adjacent cylindrical sections are adhesively bonded together.

FIG. 5 is a series of operating views showing the successive steps in a cycle of system operation in the continuous mode.

DETAILED DESCRIPTION REFERRING TO DRAWINGS

Figure 1:
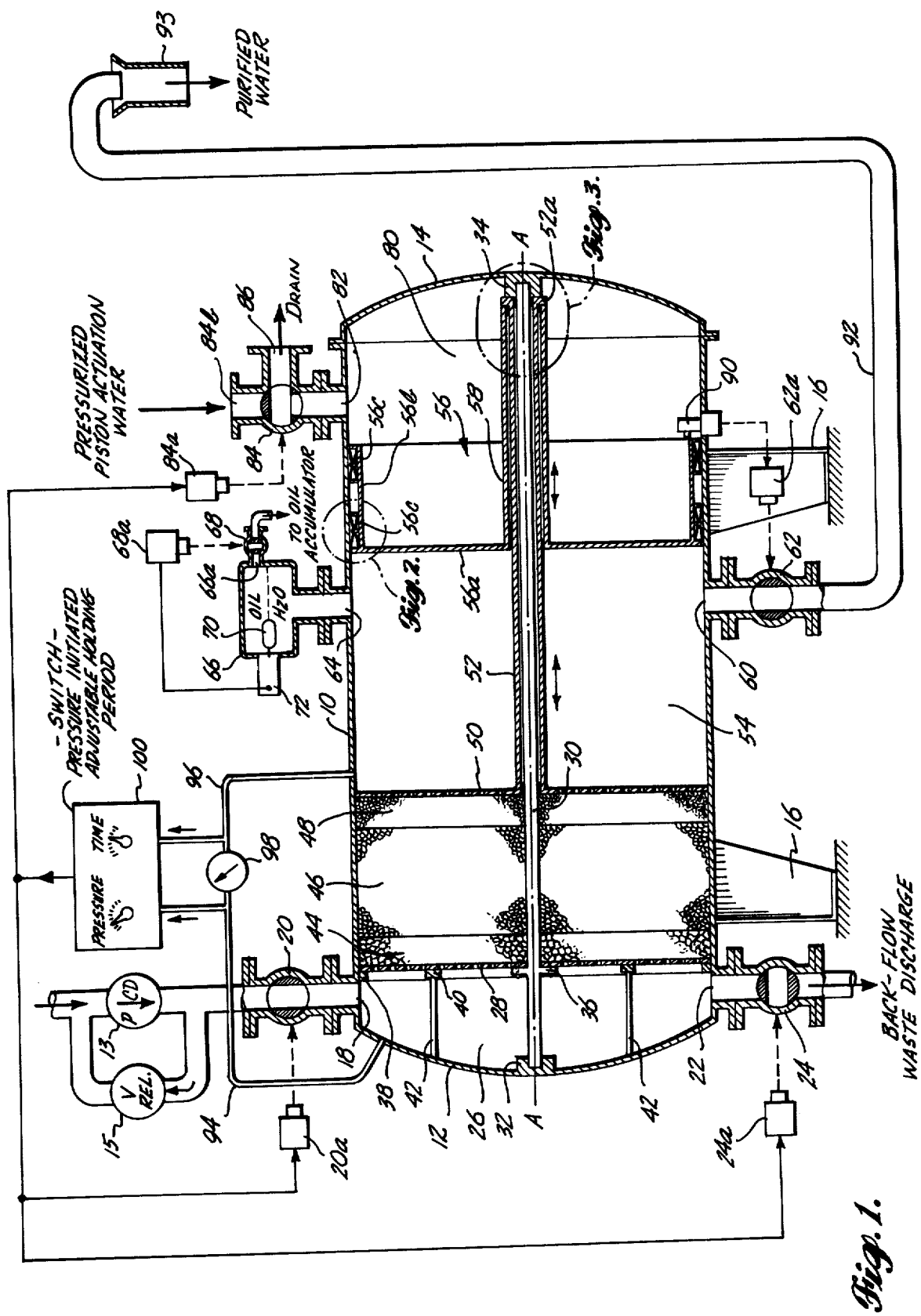
FIG. 1 shows in longitudinal section a separator vessel and associated system of components applying the preferred embodiment of the invention in the continuous mode.

Referring to the drawings, the preferred form of the invention adapted for the continuous operating mode but also usable in the retention mode comprises the elongated, substantially cylindrical pressure vessel 10 having opposite convexly rounded ends 12 and 14. Legs 16 are provided to support the vessel with its longitudinal axis horizontal as shown. Other orientations such as vertical or sloping may be employed if desired. In some cases space limitations may govern design position, as they may design proportions and size, since in large-volume processing systems pressure vessels may be up to ten feet or larger in diameter and substantially longer than the diameter. Adjacent the end 12 the pressure vessel has an inlet port 18 through which the immiscible liquid mixture to be separated is introduced by way of a normally open inlet valve 20. This valve is adapted to be operated by an electrically energizable solenoid or other operating device 20a shown schematically. The inlet is conveniently located at the top of the pressure vessel although it need not be. Adjacent the end 12 is also a pressure vessel outlet 22 preferably located at the bottom to serve as a drain. Outlet 22 is controlled by a normally closed valve 24 adapted to be operated by a solenoid or other operating device 24a. The end space 26 within the pressure vessel 10 adjacent the end 12 and communicating with both openings 18 and 22 forms a pressurizable liquid receiving chamber 26.

Constant-delivery pump 13 (of a type designed to pump at substantially constant rates) connected to the source (not shown) of immiscible liquids and solids to be separated feeds the immiscible liquids into chamber 26. The pump is bypassed by normally closed adjustable pressure relief valve 15, the setting of which is selected such that pump delivery pressure is held to a specified upper limit. Thus, when valve 20 is closed as a condition during the filter body regeneration (backwash and compression) cycle, the pump is protected.

A perforated or multi-apertured flat circular plate (or rigid screen) 28 disposed normally to the longitudinal axis A—A of the pressure vessel forms the opposite end of receiving chamber 26. Apertured plate 28 is stationarily mounted in the pressure vessel 10. It is centrally apertured to pass a longitudinally extending guide rod 30 fixedly mounted in end sockets 32 and 34 to extend along the pressure vessel axis A—A. Rod 30 has an annular flange 36 to which the apertured plate 28 is bolted. The outer edge of the plate 28, where it fits closely against the inside of the wall of vessel 10, abuts against and may be secured to an annular lip 38 extending around the inside wall of vessel 10 on the side of the plate facing toward the end wall 12. An annular supporting ring 40 abuts the same side of the plate at an intermediate radial location and is supported there by spokes or rods 42 extending parallel to the central rod 30 and backed by the vessel end wall. Thus, the relatively thin plate 28 is supported against appreciable bending or bowing toward the vessel end wall 12 when placed under hydraulic pressure exerted from the side of the plate opposite the end wall 12.

It should be noted in passing that the particular guide arrangement including the guide rod 30 and associated stabilizer tubes 52 and 58 are illustrative of a guiding arrangement that prevents tilting and binding of piston 56 in cases wherein the cylinder diameter is large in relation to length of the piston. For relatively small diameter units special stabilizing guide means of this general nature may be unnecessary.

A filter body abuts and is bonded to plate 28. This filter body is preferably formed of successively abutted cylindrical sections 44, 46 and 48 of open-pore (reticulated or dewindowed) synthetic foam material such as polyurethane or polypropylene, having visco-elastic, hydrophobic and oleophilic properties. Broadly, other filter materials may also be used. Filling out the cross-section of vessel 10, the cylindrical sections are initially somewhat larger in outside diameter than the interior of vessel 10. Hence when installed they are under compression and fit tightly in the vessel so as to press firmly against its wall and thereby preclude low-pass flow of separation mixture liquids around them from chamber 26. However, while subject to frictional drag on the vessel wall, the filter body sections are nevertheless longitudinally slidable in vessel 10. Centrally apertured to pass the guide rod 30, the stacked filter body sections 44, 46 and 48 are sandwiched between the apertured end plate 28 and a similar opposing end plate 50. The latter is mounted on one end of a support and guide tube 52 slidably mounted on the central guide rod 30. The apertured plate 50 is slightly smaller in outside diameter than the interior of the pressure chamber 10.

Preferably, the reticular filter body section 44 is of relatively large-pore material such as ten to thirty pores per inch whereas the next adjoining filter body section 46 is of somewhat smaller pore material such as thirty to sixty pores per inch, while the third section 48 is of still finer pore size, such as sixty to one hundred pores per inch. The pore size of the fine pore material should be smaller when processing mixtures with light oils than when processing mixtures with heavy oils. The relative thickness of the sections may vary depending on solid particle sizes and distribution of sizes and upon the relative volume of solid material in the mixture. The larger the particles to be separated, the larger should be the pore size of section 44 to avoid its premature plugging by the particles. The greater the percentage of solids to be separated from the initial mixture, the thicker should be section 44 relative the middle end sections 46 and 48 so as to avoid premature saturation and plugging of section 44 with captured solids. In the example, section 44 is substantially equal in thickness to the section 48 and is in turn a small fraction of the thickness of the intermediate section 46. These filter body sections are adhesively bonded or otherwise attached to each other at their interfaces. The end sections 44 and 48 are adhesively bonded or otherwise attached (such as by spiral edge lacing using monofilament nylon or other suitable material) to the respective apertured end plates 28 and 50. Thus when plate 50 is pulled away from plate 28 by retraction of piston 56 the filber body will be stretched out positively to its original length from a state of compression. It is found through trial that bonding, lacing or one or more other means of attachment, at each interface is sufficient if it extends over a circular band 61 near the outer edge of each interface. Bonding near the center between sections is sufficient if it extends over a narrow circular band 63 around the central aperture that passes the guide rod 30 (i.e., adjacent to where the frictional restraint forces occur), as shown best in FIG. 4. While the entire interface areas could be bonded together with exercise of care to minimize chances of plugging the interface pores with adhesive, the risk and tolerance requirement in that respect is reduced by applying the adhesive in the narrow zones indicated while still assuring use of an adequate amount of adhesive so the parts do not separate under tension.

Figure 2:
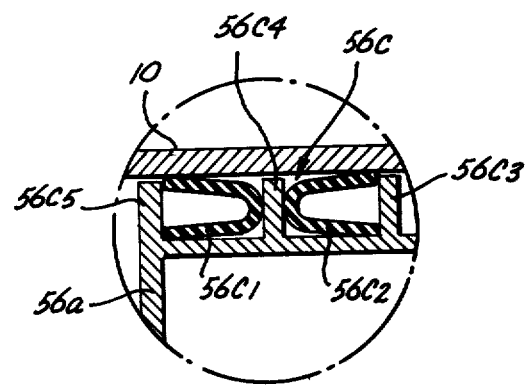
FIG. 2 is an enlarged detailed view of one of the compressor piston seals incorporated at each of two locations lengthwise of the piston shown in FIG. 1.
Figure 3:
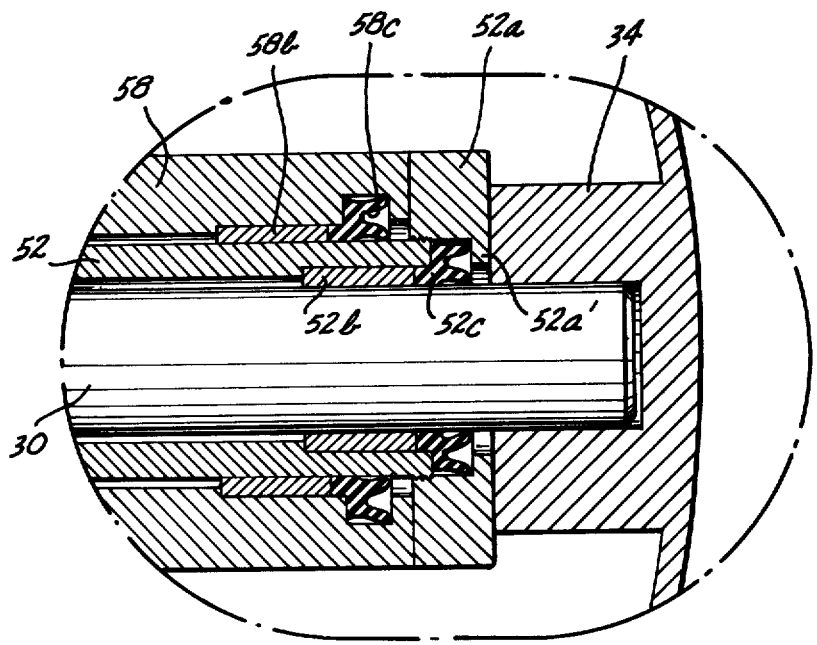
FIG. 3 is an enlarged detailed view of the outer end portions of the coaxial tubes that respectively support and guide the piston and the multi-apertured downstream filter body end plate, the view illustrating in particular the end seals and stop arrangement for such tubes.

Normally, the multi-apertured plate 50 is in fully retracted position as shown in FIG. 2, a position in which the seal retainer nut 52a threaded on the outer end of guide rod 52 abuts the rod socket 34 serving as a positioning stop (FIG. 3). In this position, plate 50 forms one end wall of a liquid collecting chamber 54. The chamber's opposite end wall is provided by the end face 56a of a piston 56 that is slidably fitted in the cylindrical pressure vessel 10. Piston 56 is mounted on a central support and guide tube 58 slidably encircling the guide tube 52. In the normal or retracted position of piston 56 shown in FIG. 1, the free end of its support tube 58 is abutted against the nut 52a with the latter in turn abutted against the rod socket 34. Liquid collecting chamber 54 has a drainage outlet 60 preferably in its lower wall controlled by a normally open valve 62. Valve 62 is adapted to be closed by a solenoid or other operating device 62a as shown.

At the top of liquid collecting chamber 54 is an oil/water outlet 64 that leads into an oil discharge chamber or vessel 66. Except in the immediate vicinity of outlet 60, flow velocity in chamber 54 is sufficiently low due to its large cross-section that the lighter-than-water grades of coalesced oil being processed in the continuous mode emerging from the downstream end of the filter body (i.e., through the holes in the screen or plate 50) rise through outlet 64 into oil discharge vessel 66 where the oil accumulates to increasing depth measured from the top down. At or adjacent the top of the vessel 66 is an oil outlet 66a controlled by a normally closed valve 68 adapted to be operated by a solenoid or other operating device 68a. Within the vessel 66, at preselected normal level, is an arm-supported float 70. The float arm can swing up and down to open and close an electrical switch 72 with changing level of the oil/water interface. The float 70 is designed to have such an effective buoyancy that it floats at the interface level between oil floating in the upper part of the vessel 66 and the underlying body of water. When the interface drops to a certain level, switch 72 is actuated so as to open valve 68 and allow a certain amount of the oil to be expelled by water pressure in chamber 54, whereupon the switch is reversely actuated and the process of accumulating oil allowed to resume. This float switch arrangement is designed for operation of the apparatus in its continuous mode wherein it is used to separate relatively light oil from water. It will be noted that when water is used to actuate piston 56 there is no need to make special arrangements to isolate the oil discharge chamber 66 from the pressure vessel 10 on the back side of the piston when it has advanced past the outlet 64 (FIG. 5, step 3). However, if other liquid is used, or a gas, to advance the piston it may be desirable to effect such isolation or to tap off whatever materials have entered the oil discharge chamber when the piston is retracted and before resuming controlled operation of the system.

Piston 56 is formed by the flat circular plate 56a and a tubular skirt 56b slightly smaller in diameter than the interior wall of the pressure vessel 10. Skirt 56b carries two axially spaced seals 56c of similar form shown in detail in FIG. 2. Seal 56c comprises two annular elastic rings 56c₁ and 56c₂ of U-shaped cross-section received in back-to-back positions between respective pairs of longitudinally spaced flanges, 56c₃ and 56c₄, and 56c₄ and 56c₅. The spacing between sets of seals 56c parallel to the axis A—A is slightly in excess of the diameter of the outlet port 64.

At the ends of the guide tubes 52 and 58 as shown in FIG. 3 additional seals are provided to prevent leakage of water with oil under pressure from one chamber to another past the guide tubes. The outer end of the guide tube 52 has a counterbore to receive a slide bushing 52b slidably retained on rod 30, its outer edge being set back slightly from the end edge of the guide tube 52 itself. The locking nut 52a that threads onto the guide tube 52 has a counterbore that forms an end flange 52a' serving as a retainer for the flexible annular seal 52c. The latter is maintained under slight compression to form a sliding seal between the guide tube 52 and the guide rod 30. A similar formation on the end of the guide tube 58, including a slide bushing 58b and a flexible seal 58c received in an annular groove slidably seal the end of the guide tube 58 with the guide tube 52.

The seals mutually isolate the chambers in vessel 10 at different pressures and also serve to scrape grit from the respective surfaces contacted by them, thereby to protect the associated bushings and wall surfaces against excessive wear.

The space within the pressure vessel between the end wall 14 and the backside of the piston 56 constitutes a pressurizable piston actuation chamber 80 having an inlet/outlet port 82 controlled by a valve 84. Valve 84, normally opened in order to provide a relief drain for chamber 80, is adapted to be repositioned by a solenoid or other operating device 84a to close the valve drain port 86 and to open the valve inlet 84b for admitting water (or other fluid) under pressure such as twenty psi from an external source (not shown) into the pressure chamber 80. When this occurs the piston 56 is advanced in the pressure vessel 10 toward the filter body end plate 50.

Control of the mechanism may be based on any of a variety of parameters and alternative methods in order to initiate and time the duration of its operating cycles. For example, initiation of piston advancement may be controlled by a human operator observing through a viewing window that flow has been excessively decreased as an indication the filter body is plugged. The illustrated system is designed for automatic operation. For purposes of such automatic operation, the operating solenoid 62a for water outlet valve 62 is placed under control of a switch device 90 that is engageable by the piston 56 with the latter in its fully retracted position. In that position, the switch is set by the piston so that drain valve 62 is maintained open. In this open setting, valve 62 permits continuing discharge of purified water through the outlet port 60 and through the outlet pipe 92. The latter extends upwardly to a level above the level of the oil discharge vessel 66 so as to maintain a slight positive pressure in chamber 54. Purified water discharges from pipe 92 through a suction breaker 93 into a suitable receptacle or an open body of water as may be desired (neither being shown). While water continues to discharge through outlet pipe 92 in the continuous operating mode, float switch 72 controlling solenoid 68a opens valve 68 each time the level of oil accumulating in the discharge vessel 66 drops sufficiently to actuate the float switch. During the flow-through coalescing/separating process occurring in vessel 10 there is, of course, a pressure drop between liquid receiving chamber 26 and liquid collecting chamber 54 incurred by the flow-through resistance of the filter body 44, 46, 48. With continued operation and the attendant increasing accumulations of dirt and oil in the filter body, flow resistance of the filter body increases. Because the pump 13 causes substantially constant flow, the increased flow resistance causes a rise in pressure drop across the filter body. When that drop reaches a preselected value, gauged to the need for regenerating the filter body, the difference of pressures (indicated on gauge 98) applied through tubes 94 and 96 to switch device 100 actuates the switch to energize the solonoids for valves 20, 24 and 84. Valve 20 is thereby closed, valve 24 is opened and valve 84 is positioned to introduce water under relatively high pressure (such as twenty psi) into the piston chamber 80. Immediately thereupon rising pressure in chamber 80 causes piston 56 to advance toward the multi-apertured plate 50 and as it does so causes actuation of switch 90 to energize solonoid 62a so as to close the valve 62. Valve 68 is unaffected. As a result of the advancement of the piston, the quantity of water contained in the liquid collecting chamber 54 is forced in a backwash direction through the filter body 44, 46 and 48, so as to backwash the pores of the filter body sections and force the accumulated dirt and oil into the chamber 26 where it is free to flow out of the drain opening 22. The backwash water, dirt and oil forced first by piston-induced backwash flow and thereafter by squeezing out of the filter body is dumped into a tank or reservoir (not shown) wherein the solids are allowed to settle to the bottom for eventual disposal. Oil rising to the top is tapped off in the usual manner. The remaining liquid (water with or without remaining vestiges of oil can be recirculated through the system if necessary or desirable.

Piston 56 continues its advance until it contacts the plate 50 and starts the physical compression of the filter body. Because of the nonlinear (visco-elastic) compression properties of the filter body material and friction on the walls and guide rod, continued advancement of the piston causes first the small pore filter body section 48 to be progressively compressed starting with the material closest to the plate 50 and continuing throughout its thickness until it is nearly fully compressed whereupon the compression force is transmitted to and becomes effective to progressively compress the next section 46 in like manner, and finally the same with respect to the last section 44 to be compressed. The action is depicted in Steps 1, 2 and 3 of FIG. 5. When the filter body is fully compressed as compactly as the pressure available from the inlet 84b will make it, that compression is held for a time period, such as one minute, so as to allow as much oil as will drain from the compressed material to do so through the openings in the plate 28a and to run out of the drain outlet 22. This required time interval from the inception of piston movement and the terminal point of the desired filter body compression holding period usually can be predicted with sufficient accuracy that it can be regulated by the setting of a holding timer of any suitable design in the switch 100.

At the end of the pre-set time interval, the timer in switch 100 causes the switch to reverse its position and thereby deenergize the solenoids 24a, 20a and 84a. This restores the flow of unseparated mixture into the chamber 26, closes the drain 22 and reopens the drain at 86. As the chamber 26 and compressed filter body fills under pressure, even a low pressure such as five pounds per square inch progressively forces the piston back toward its retracted position. This forced retraction movement of the piston continues until the outer end of its supporting guide tube 58 bears against the stop nut 52a on the end of the supporting guide tube 52 for the multi-apertured plate 50. That contact takes place after a certain "lost motion" materially before the filter body is fully reexpanded to its original length and open-pore condition. This is true because the limited elastic rebound of the filter body material and the frictional restraint of the filter body imposed by the wall of pressure vessel and by the guide rod 30 prevent the filter body from reexpanding, even under the forces of reestablished flow through the filter body from chamber 26. However, continued forced retraction of the piston is utilized to stretch the filter body back to its original length, that point being established by final abutment of stop nut 52a against stop 34. This positive stretching or extension of the filter body back to its original length is found to be necessary if the original openness to flow and to hold oil and dirt is to be restored after compression. Due to wall friction and limited rebound resilience of the filter material, even tolerable overpressuring of the inlet chamber 26 to force accelerated flow will not of itself effect full reexpansion of the filter body throughout its length without the aid of piston 56 and its coupling sleeve acting on the coupling sleeve 52 of plate 50. Bonding the filter body sections together and the end faces thereof to plates 28 and 50 is essential to stretching of the filter body as described.

It will thus be appreciated that a fully automatic continuous mode separator system has been described that can be made inexpensively and of lightweight construction, including the thin filter body end plates, the piston and the pressure vessel itself. The forces exerted by hydraulic pressures on these members are distributed forces and thus do not require rigid structural members to withstand them, even with pressure vessels as large as ten feet or more in diameter and longer than the diameter. The piston engaging the adjacent end plate of the filter body in face-to-face contact applies distributed load to the latter during the compression stroke.

When the system is operated in the retention mode, as it typically will be with oil near the density of water and highly viscous, the filter body tends to plug up much more quickly and require regeneration. In this mode the oil is not allowed to escape beyond the filter body into chamber 54. The pressure response setting of switch 100 is gauged to prevent this from occurring. When operated by manual observation and controls the human operator/observor detects when the filter body requires regeneration and initiates piston advancement.

When such a system is intended by design to operate only in the retention mode, it is unnecessary to have a collecting chamber 54 of appreciable length, and indeed the oil discharge chamber 66 and associated float valve arrangement can be dispensed with altogether. The pressure vessel 10 may thereby be shortened, with the water outlet 60 placed immediately adjacent to the downstream face of the multi-apertured plate 50 in its normal position, and with the retracted piston 56 now located immediately adjacent to the downstream edge of the repositioned water outlet 60. With the shortened vessel 10, the end wall 14 of the tank is close to the rear edge of the piston in its retracted position. In automatically recycled operation in the retention mode, however, the controls and the operating sequences are otherwise essentially the same as in the continuous mode.

In either mode, a limited (measured) albeit sufficient amount of water contained in the filter body and in chamber 54 is available to backwash the filter body. This backwash quantity is known and since it is not large it becomes easily accomodated for subsequent recycling or processing. As will be noted, during advancement of the piston, the backwash flow purging action of the piston preferably precedes its forcible compression purging action on the filter body. In cases wherein the piston may tend to bind on the end plate guide tube 52, so as to prematurely start compression of the filter body, a suitable latching device may be used to physically hold the end plate 50 in position until the advancing piston reaches the end plate. At that point, the piston will trip the latch so as to release the end plate and permit it to be advanced by the piston in completing the compression stroke of the piston. In any event, the quantity of backwash liquid driven through and out of the filter body during the purging stroke of the piston is predetermined. In the retention mode, there is an even more important reason to have a predictably limited backwash volume, of course, in that it carries the coalesced oil and dirt with it out of opening 22 during the compression phase.

These and other aspects of the improvements represented by this invention will be appreciated by those skilled in this art having reference to the foregoing disclosure of the preferred and illustrative embodiment thereof.

The embodiments of the invention in which an exclusive property or privilege is claimed are as follows:

1. Apparatus for separating from water coalesced oil and uncoalesced oil, with solids and without solids, comprising a pressure vessel having a substantially cylindrical inside wall including therein a liquid receiving chamber and a processed liquid collecting chamber axially separated from said receiving chamber by an axially stretchable and compressible cylindrical filter body of open-pore flexible filter material received in sliding contact with said inside wall, said filter body substantially tightly filling the cross-sectional area of said vessel and having transversely disposed opposite end faces, multi-apertured end members attached to the respective end faces of said filter body so as to exert tension in the filter body over substantially the full cross-sectional area thereof by relative separation movement of said end members, the first such end member adjacent said receiving chamber being fixed against axial movement in said pressure vessel, the second such end member being axially movable in said vessel, means to introduce liquids under pressure into the receiving chamber, means to conduct liquids from the receiving chamber, means to conduct liquids from the collecting chamber after passing through the filter body, and force-applying means connected to said second end member and selectively operable to apply force thereto for moving the same axially in either of opposite directions, thereby alternately to stretch out the filter body forcibly to predetermined length and to compress the filter body against said first end member so as to squeeze oil and solids therefrom in a backwash direction.

2. The apparatus defined in claim 1 wherein the force applying means comprises a piston member slidably fitted in said pressure vessel to reciprocate axially therein between a retracted limit position withdrawn from the second end member across the axial length of collecting chamber and an advanced position fully compressing the filter body against the first end member, with the piston member pressed against the second end member.

3. The apparatus defined in claim 2 wherein the pressure vessel further includes a pressure chamber therein adjacent the side of the piston member opposite the filter body, and means operable selectively to introduce fluid under pressure into said latter pressure chamber to advance the piston for compressing the filter body, and to permit drainage whereby from such latter pressure chamber such that liquid introduced under pressure into the receiving chamber is permitted to effect piston retraction into its retracted limit position.

4. The apparatus defined in claim 3 and coupling means between said second end member and said piston member permitting predetermined retraction movement of said piston member before the latter effects withdrawal of said second end member to forcibly stretch out said filter body.

5. The apparatus defined in claim 4 wherein the coupling means comprises an elongated member centrally mounted on the second end member and projecting axially therefrom slidably through the piston member to first abutment means on the said elongated member, said piston member having cooperable second abutment means engageable by said elongated member abutment means.

6. The apparatus defined in claim 5, wherein the pressure chamber includes a coaxially mounted stationary guide rod, said filter body and said second end member being generally apertured to slide on said guide rod, said elongated member comprising a first guide tube slidably encircling the guide rod, said piston being centrally apertured to slide on said first guide tube.

7. The apparatus defined in claim 6 wherein the piston member mounts a second guide tube projecting coaxially from the side thereof opposite the filter body and slidably encircling said first guide tube, said first guide tube having on the projecting end thereof a transversely extending element forming the first abutment means, the projecting end of said second guide comprising the second abutment means.

8. The apparatus defined in claim 7 wherein the end members comprise multi-apertured flat plate-like members and the filter body comprises a stack of cylindrical open-pore visco-elastic foam sections attached together in face-to-face contact, with the endmost sections attached to the respectively adjacent end members.

9. The apparatus defined in claim 8 wherein the section attached to the first end member has an average pore size at least twice that of the section attached to the second end member.

10. The apparatus defined in claim 7 wherein the filter body is characterized by average foam pore size in the region adjacent to the first end member at least a few times the average foam pore size in the region adjacent to the second end member.

11. The apparatus defined in claim 1 wherein the filter body comprises a stack of cylindrical open-pore synthetic foam sections adhesively bonded together in face-to-face contact.

12. The apparatus defined in claim 11 wherein the section bonded to the first end member has an average pore size at least a few times that of the section bonded to the second end member.

13. The apparatus defined in claim 1 wherein the filter body is characterized by average foam pore size in the region adjacent to the first end member at least twice the average foam pore size in the region adjacent to the second end member.

14. The apparatus defined in claim 1 further comprising means operable during flow through the filter body produced by pressure in the receiving chamber to sense pressure drop across the filter body, such pressure drop being proportional to flow resistance through the filter body affected by degree of plugging of its pores by dirt and retained liquid, and means responsive to such pressure drop above a predetermined value to initiate operation of such force-applying means to move the second end member in the direction to compress the filter body.

15. The apparatus defined in claim 1, including oil discharge chamber means coupled to an upper portion of said collecting chamber and operable to collect oil and discharge oil therefrom without discharging water.

16. The apparatus defined in claim 4, including oil discharge chamber means coupled to an upper portion of said collecting chamber and operable to collect oil and discharge oil therefrom without discharging water.

* * * * *